United States Patent
Okada et al.

(10) Patent No.: US 9,803,566 B2
(45) Date of Patent: Oct. 31, 2017

(54) ABNORMAL COMBUSTION DETECTION APPARATUS FOR INTERNAL COMBUSTION ENGINE

(71) Applicant: TOYOTA JIDOSHA KABUSHIKI KAISHA, Toyota-shi, Aichi (JP)

(72) Inventors: Yoshihiro Okada, Susono (JP); Yutaka Hayakawa, Okazaki (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 200 days.

(21) Appl. No.: 14/429,608

(22) PCT Filed: Feb. 14, 2014

(86) PCT No.: PCT/JP2014/053418
§ 371 (c)(1),
(2) Date: Mar. 19, 2015

(87) PCT Pub. No.: WO2014/129389
PCT Pub. Date: Aug. 28, 2014

(65) Prior Publication Data
US 2016/0003173 A1   Jan. 7, 2016

(30) Foreign Application Priority Data
Feb. 19, 2013 (JP) .................. 2013-029726

(51) Int. Cl.
*F02D 35/02* (2006.01)
*G01M 15/12* (2006.01)
*F02D 41/00* (2006.01)

(52) U.S. Cl.
CPC .......... *F02D 35/027* (2013.01); *G01M 15/12* (2013.01); *F02D 41/008* (2013.01); *F02D 2200/101* (2013.01)

(58) Field of Classification Search
CPC .... G01M 15/12; F02D 35/027; F02D 41/008; F02D 2200/101; F02P 5/152; G01L 23/225; G01L 23/221
See application file for complete search history.

(56) References Cited

U.S. PATENT DOCUMENTS

| | | | |
|---|---|---|---|
| 7,681,552 B2* | 3/2010 | Kaneko | F02P 5/152 123/406.29 |
| 2009/0223281 A1 | 9/2009 | Masuda et al. | |
| 2013/0035841 A1* | 2/2013 | Glugla | F02D 41/22 701/105 |

FOREIGN PATENT DOCUMENTS

| JP | H03-258955 A | 11/1991 |
|---|---|---|
| JP | 2006-307807 A | 11/2006 |
| JP | 2009-209828 A | 9/2009 |

* cited by examiner

*Primary Examiner* — Paul West
*Assistant Examiner* — Xin Zhong
(74) *Attorney, Agent, or Firm* — Andrews Kurth Kenyon LLP

(57) ABSTRACT

An object of the present invention is to provide a technology that enables an abnormal combustion detection apparatus for a spark ignition internal combustion engine having a plurality of cylinders to detect abnormal combustion such as pre-ignition and knocking with improved accuracy. To achieve the object, according to the present invention, in an abnormal combustion detection apparatus for a spark-ignition internal combustion engine that determines or detects the occurrence of abnormal combustion by comparing a vibration intensity obtained from a measurement signal of a knock sensor and a determination threshold, when the occurrence of abnormal combustion is detected, the apparatus corrects a determination threshold for the next cylinder using as parameters the peak value of the vibration intensity at the time of the occurrence of abnormal combustion and the engine speed.

16 Claims, 10 Drawing Sheets

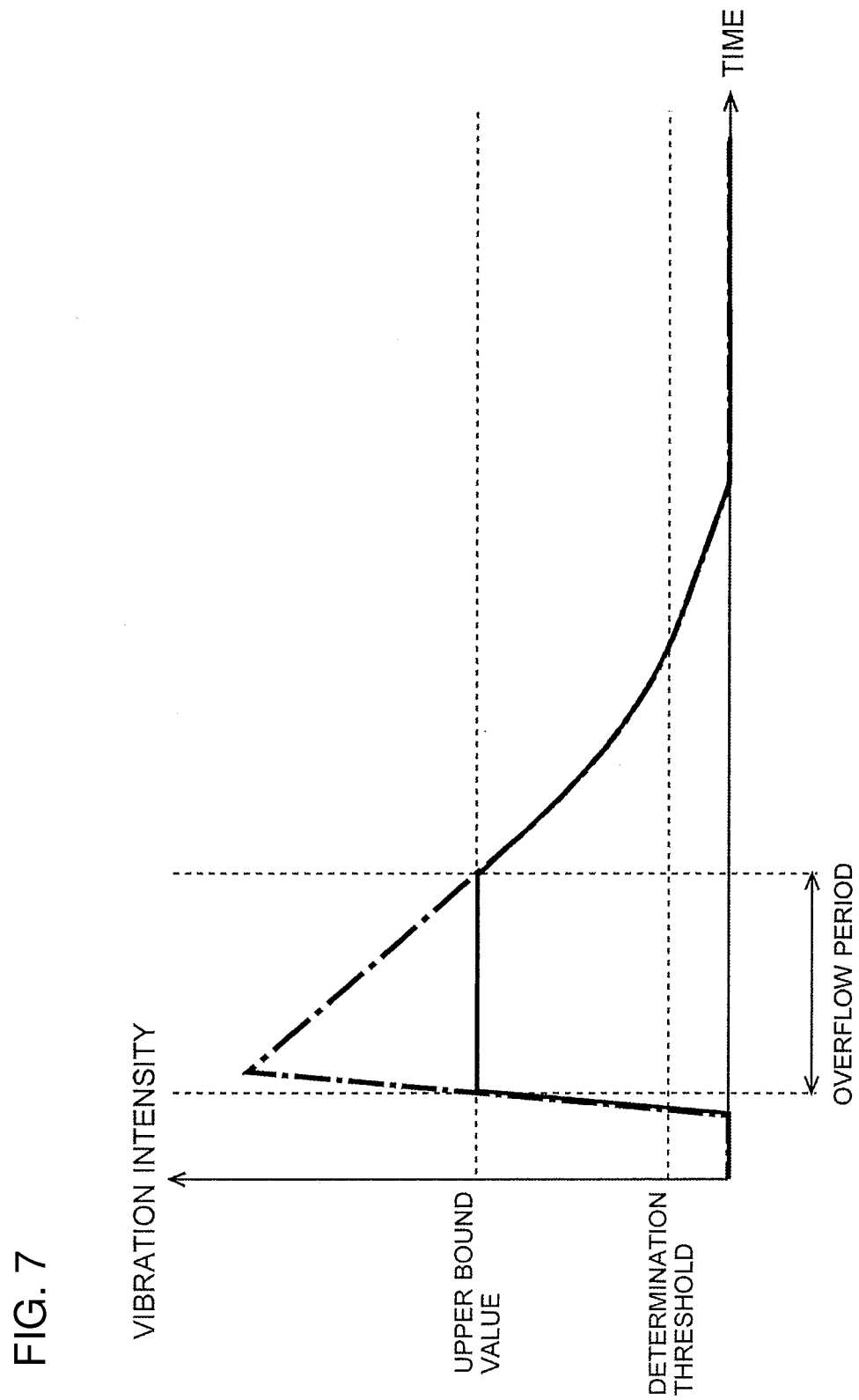

ABNORMAL COMBUSTION DETECTION APPARATUS FOR INTERNAL COMBUSTION ENGINE

CROSS-REFERENCE TO RELATED APPLICATIONS

This is a national phase application based on the PCT International Patent Application No. PCT/JP2014/053418 filed Feb. 14, 2014, claiming priority to Japanese Patent Application No. 2013-029726 filed Feb. 19, 2013, the entire contents of both of which are incorporated herein by reference.

TECHNICAL FIELD

The present invention relates to a technology of detecting abnormal combustion such as pre-ignition and knocking in an internal combustion engine.

BACKGROUND ART

There is a known art pertaining to a spark-ignition internal combustion engine in which vibration intensity changing patterns in multiple frequency ranges are extracted from a signal picked up by a knock sensor in a predetermined knock determination period, and it is determined that knock is occurring if the number of vibration intensity changing patterns in frequency ranges that rise at the same timing among the vibration intensity patterns in the plurality of frequency ranges is equal to or larger than a threshold (see, for example, Patent Literature 1).

Patent Literature 2 describes a technology in which a knock determination period and a noise determination period are set, effects of noise on a signal picked up by the aforementioned knock sensor are determined based on the signal picked up during the aforementioned noise determination period, and the determination as to the occurrence of knocking that is made based on the aforementioned picked-up signal during the aforementioned knock determination period is suspended based on the result of determination.

Patent Literature 3 describes a technology of estimating the intensity of knock from the rise time and the fall time of a knock signal output by a knock sensor.

CITATION LIST

Patent Literature

Patent Literature 1: Japanese Patent Application Laid-Open No. 2009-209828
Patent Literature 2: Japanese Patent Application Laid-Open No. 2006-307807
Patent Literature 3: Japanese Patent Application Laid-Open No. H03-258955

SUMMARY OF THE INVENTION

Problems to be Solved by the Invention

In some cases, the air-fuel mixture in the cylinder may ignite before ignited by the ignition plug (pre-ignition), initiated by an ignition source such as a deposit adhering to the ignition plug or the wall of the combustion chamber or lubricant oil entering the combustion chamber. The pre-ignition tends to cause strong vibration. When there occurs abnormal combustion that causes strong vibration, such as knock or pre-ignition causing high-intensity vibration, there is a possibility that the vibration caused by those types of abnormal combustion may still linger in the knock detection period for the next cylinder. When this is the case, there is a possibility that it may be determined mistakenly that knock is occurring in the next cylinder, through knock is not occurring actually.

The present invention has been made in view of the above-described circumstances, and its object is to provide a technology that enables an abnormal combustion detection apparatus for a spark ignition internal combustion engine having a plurality of cylinders to detect abnormal combustion such as pre-ignition and knocking with improved accuracy.

Means for Solving the Problems

To achieve the object, according to the present invention, in an abnormal combustion detection apparatus for an internal combustion engine that measures the intensity of vibration of a spark-ignition internal combustion engine having a plurality of cylinders and detects the occurrence of abnormal combustion by comparing the measured vibration intensity and a determination threshold, when the occurrence of abnormal combustion is detected, the apparatus is adapted to correct the determination threshold for a next cylinder using as parameters a peak value of the vibration intensity at the time of the occurrence of abnormal combustion and the engine speed.

Specifically, there is provided an abnormal combustion detection apparatus for a spark-ignition internal combustion engine having a plurality of cylinders, comprising:

measurement means for measuring the vibration intensity of the internal combustion engine;

determination means for performing determination processing, which determines that abnormal combustion occurs, if the vibration intensity measured by said measuring means in a determination period set for each cylinder is higher than a determination threshold; and correction means for correcting a determination threshold to be used in determination processing for a next cylinder on the basis of a peak value of the vibration intensity measured by said measurement means at the time when the abnormal combustion occurs and an engine speed, when it is determined by said determination means that the abnormal combustion occurs.

When abnormal combustion that causes strong vibration occurs in one cylinder of an internal combustion engine, there is a possibility that the vibration caused by the abnormal combustion lingers in a determination period for the next cylinder. The intensity of vibration lingering in the determination period for the next cylinder correlates with the peak value of the intensity of vibration caused by the occurrence of abnormal combustion and the length of time from the time of detection of the aforementioned peak value to the determination period for the next cylinder. The length of time from the detection of the aforementioned peak value to the determination period for the next cylinder correlates with the rotation speed of the crankshaft.

Therefore, it can be considered that the intensity of the vibration lingering in the determination period for the next cylinder correlates with the aforementioned peak value and the engine speed. Therefore, the abnormal combustion detection apparatus according to the present invention is adapted to correct the determination threshold to be used in the determination processing for the next cylinder on the basis of the aforementioned peak value and the engine speed. In consequence, when abnormal combustion is not occurring in the next cylinder, an incorrect determination that abnormal combustion is occurring is unlikely to be made. Therefore, the determination processing for the next cylinder can be performed with improved accuracy.

The correction means according to the present invention may be adapted to calculate the intensity of vibration lingering in the determination period for the next cylinder using as parameters the aforementioned peak value and the engine speed and correct the determination threshold by adding the result of calculation to the determination threshold. With this feature, the determination processing for the next cylinder can be performed with improved accuracy, even in the case where vibration caused by abnormal combustion lingers in the determination period for the next cylinder.

When abnormal combustion causing strong vibration such as knock or pre-ignition with high vibration intensity occurs, there is a possibility that the vibration intensity may exceed the upper bound of the measurement range of the measurement means. One countermeasure to this is to extend the measurement range of the measurement means. However, extending the measurement range can lead to a deterioration in the detection accuracy for knocks with low vibration intensities.

In view of the above-described circumstance, in the case where the measurement signal of said measurement means exceeds the upper bound of the measurement range of the measurement means, the correction means according to the present invention may use, as a value correlating with the vibration intensity, the duration of the period (overflow period) during which the measurement signal is equal to or higher than the upper bound value. In other words, the correction means may correct the determination threshold to be used in the determination processing for the next cylinder on the basis of the duration of the overflow period and the engine speed.

The duration of the period (overflow period) during which the measurement signal of the measurement means is equal to or larger than the aforementioned upper bound value correlates with the vibration intensity at the time when abnormal combustion occurs. Thus, higher vibration intensities lead to longer overflow periods. Therefore, the duration of the aforementioned overflow period may be used instead of the aforementioned peak value as a parameter in correcting the determination threshold for the next cylinder, whereby the determination threshold for the next cylinder can be corrected to an appropriate value. In consequence, it is possible to prevent or reduce the occurrence of incorrect determination while preventing deterioration of the accuracy of knock detection.

When the duration of a period during which the vibration intensity measured by said measurement means is equal to or higher than an upper limit value of the measurement range (overflow period) is equal to or longer than a predetermined length of time, the determination means according to the present invention may determine that the measurement signal of the measurement means contains noise.

One known method of measuring the intensity of vibration of an internal combustion engine is to extract vibration components (vibration intensities) in a specific frequency band from a measurement signal of a sensor (e.g. knock sensor) that measures the vibration of the internal combustion engine. In this method, there is a possibility that the measurement signal may contain white noise having a large amplitude superimposed on it. When this is the case, there is a possibility that it may be determined that abnormal combustion is occurring, though abnormal combustion is not occurring actually. The white noise has uniform intensity throughout the entire frequency range. Consequently, when there is white noise, the duration of the overflow period is longer than that in the case where abnormal combustion occurs. Therefore, if the duration of the overflow period is equal to or larger than a predetermined length of time, it may be determined that there is noise. The predetermined length of time mentioned above is a length of time longer than the overflow period in the case where abnormal combustion occurs. This length of time is determined in advance by an adaptation process based on, for example, an experiment.

The determination means according to the present invention may be adapted to integrate the vibration intensity measured by said measurement means in every equal calculation period shorter than said determination period and determine that there is noise if the number of the calculation periods in which the integrated value exceeds a specific value is equal to or larger than a predetermined number.

When vibration is caused by abnormal combustion, the vibration intensity diminishes with the passage of time. On the other hand, when there is white noise, the vibration intensity is unlikely to diminish with the passage of time. Thus, in the case where abnormal combustion occurs, the aforementioned integrate value increases at the time when abnormal combustion occurs and diminishes with the passage of time thereafter. On the other hand, in the case where there is white noise, the aforementioned integrated value tends to be substantially constant. Therefore, when the number of the calculation periods in which the aforementioned integrated value is equal to or larger than a specific value is larger than a predetermined number, in other words, when a state in which the integrated value is equal to or larger than a specific value continues, it may be determined that there is noise. The "predetermined number" mentioned above is a value larger than the value obtained by dividing the length of the period throughout which the integrated value is expected to exceed the specific value when abnormal combustion occurs by the length of the calculation period. This predetermined value is determined in advance by an adaptation process based on, for example, an experiment.

Advantageous Effect of the Invention

The present invention enables an abnormal combustion detection apparatus for a spark-ignition internal combustion engine having a plurality of cylinders to detect abnormal combustion such as pre-ignition and knock with improved accuracy.

BRIEF DESCRIPTION OF THE DRAWINGS

FIG. 7 is a graph showing a case where the intensity of vibration caused by abnormal combustion overflows beyond a measurement range.

EMBODIMENTS FOR CARRYING OUT THE INVENTION

In the following, specific embodiments of the present invention will be described with reference to the drawings. The dimensions, materials, shapes, relative arrangements, and other features of the components that will be described in connection with the embodiments are not intended to limit the technical scope of the present invention only to them, unless particularly stated.

<Embodiment 1>

Figure 1:
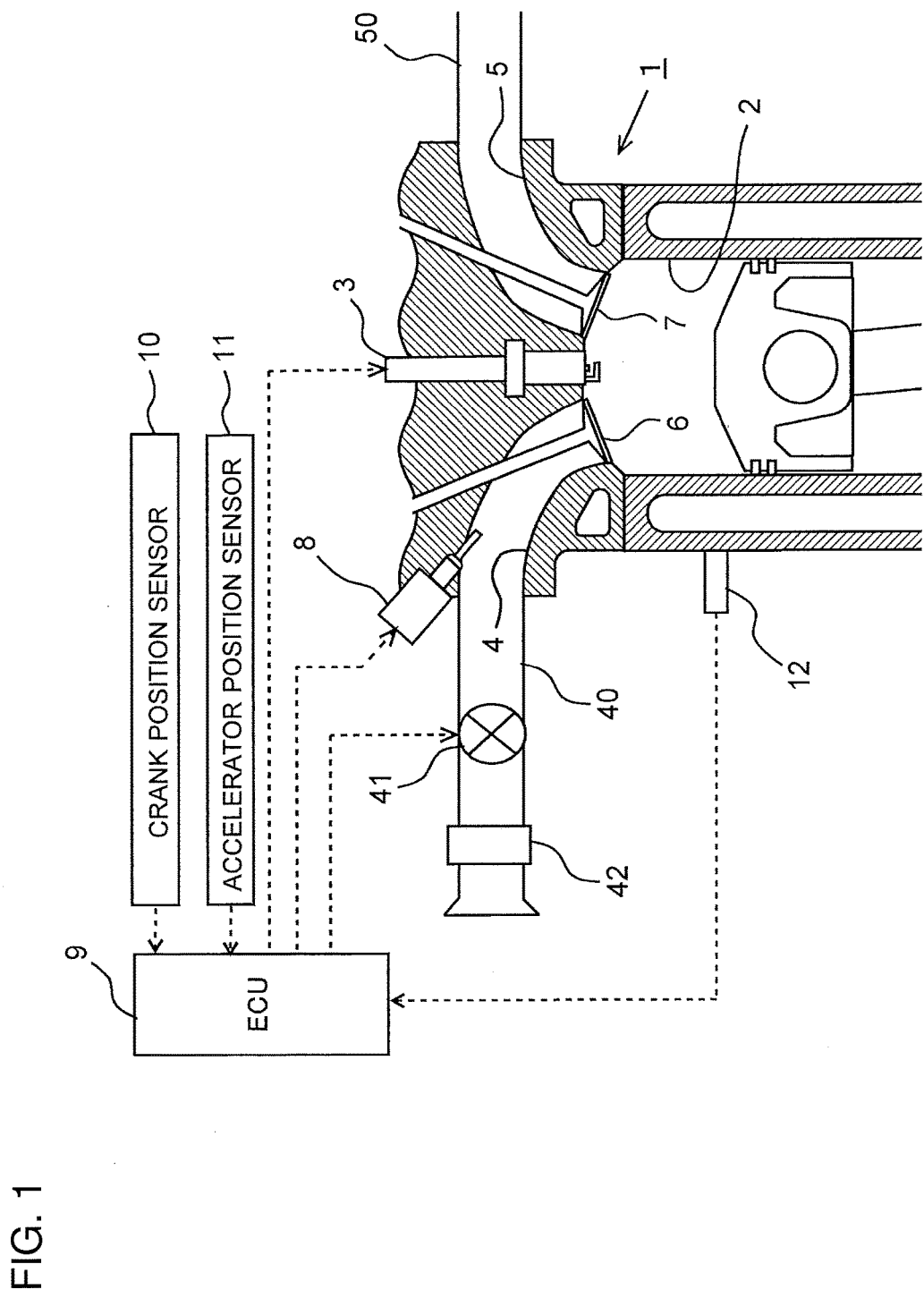
FIG. 1 is a diagram showing the general configuration of an internal combustion engine to which the present invention is applied.

Firstly, a first embodiment of the present invention will be described with reference to FIGS. 1 to 7. FIG. 1 is a diagram showing the general configuration of an internal combustion engine to which the present invention is applied. The internal combustion engine 1 shown in FIG. 1 is a spark-ignition internal combustion engine (gasoline engine) having a plurality of cylinders. In FIG. 1, only one of the cylinders of the internal combustion engine 1 is illustrated.

Each cylinder 2 of the internal combustion engine 1 is equipped with an ignition plug 3. The ignition plug 3 is a device that ignites unburned air-fuel mixture in the cylinder 2. The internal combustion engine 1 has an intake port 4 and an exhaust port 5. The intake port 4 is a channel for introducing air and fuel into the cylinder 2 of the internal combustion engine 1. The intake port 4 is closed/opened by an intake valve 6. The exhaust port 5 is a channel for discharging the gas burned in the cylinder 2 (burned gas) from the cylinder. The exhaust port 5 is closed/opened by an exhaust valve 7.

The intake port 4 is connected with an intake pipe 40. The intake pipe 40 introduces fresh air (air) taken from the atmosphere to the intake port 4. A fuel injection valve 8 that injects fuel into the intake port 4 is attached to the internal combustion engine 1 at a location near the intake port 4. The fuel injection valve 8 may be adapted to inject fuel directly into the cylinder 2. Alternatively, a fuel injection valve that injects fuel into the intake port 4 and a fuel injection valve that injects fuel into the cylinder 2 may both be provided.

A throttle valve 41 is provided in the intake pipe 40. The throttle valve 41 is a valve unit that adjusts the quantity of air supplied to the cylinder 2 by varying the channel cross sectional area in the intake pipe 40. A supercharger may be provided in the intake pipe 40 upstream of the throttle valve 41. The supercharger as such is a device that compress air, which may be, for example, a centrifugal supercharger (or turbocharger) utilizing thermal energy of exhaust gas or a mechanical supercharger utilizing the power of the internal combustion engine 1.

The exhaust port 5 is connected with the exhaust pipe 50. The exhaust pipe 50 allows the exhaust gas discharged from inside the cylinder 2 to the exhaust port 5 to flow to a tail pipe, which is not shown in the drawings. An exhaust gas purification apparatus including catalyst for purifying the exhaust gas and a silencer etc. are provided in the exhaust pipe 50.

The internal combustion engine 1 having the above-described structure is equipped with an ECU 9, which electrically controls the operation state of the internal combustion engine 1. The ECU 9 is an electronic control unit including a CPU, a ROM, a RAM, and a backup RAM etc. The ECU 9 is electrically connected with various sensors such as a crank position sensor 10, an accelerator position sensor 11, a knock sensor 12, and an air flow meter 42.

The crank position sensor 10 is a sensor that outputs an electrical signal correlating with the rotational position of the output shaft (crankshaft) of the internal combustion engine 1. The accelerator position sensor 11 is a sensor that outputs an electrical signal correlating with the operation amount of the accelerator pedal (accelerator opening degree). The knock sensor 12 is a non-resonance knock sensor, which is attached to the cylinder block of the internal combustion engine 1 and outputs a voltage correlating with the vibration of the internal combustion engine 1. The air flow meter 42 is a sensor that is attached to the intake pipe 40 upstream of the supercharger 42 and outputs an electrical signal correlating with the quantity of air flowing in the intake pipe 40 (intake air quantity of the internal combustion engine 1).

The ECU 9 controls various components such as the ignition plug 3, the fuel injection valve 8, and the throttle valve 41 on the basis of signals output from the above-described sensors. For example, the ECU 9 performs the processing of detecting abnormal combustion (abnormal combustion detection processing) in the internal combustion engine 1 using as parameters output signals of the above-described sensors, in addition to known control processing such as fuel injection control and ignition control. In the following, how the abnormal combustion detection processing is performed in this embodiment will be described.

In the spark-ignition internal combustion engine 1, the air-fuel mixture is ignited by the ignition plug 3, whereby flame is generated. The flame grows from the neighborhood of the ignition plug to the boundary of the combustion chamber. During this process, the unburned air-fuel mixture in the region remote from the ignition plug 3 (end gas) is pressed against the piston and the cylinder wall, and its temperature and pressure become high because of adiabatic compression. If the temperature and pressure of the end gas exceed a limit, the end gas may self-ignite instantaneously to cause knock.

On the other hand, if lubricant oil enters the combustion chamber or a deposit is formed on the wall of the combustion chamber, the lubricant oil and the deposit can be an ignition source that ignites the air-fuel mixture before it is ignited by the ignition plug 3 to cause pre-ignition in some cases.

When abnormal combustion such as knock or pre-ignition occurs, it is necessary to perform processing such as retarding the operation time of the ignition plug 3 (ignition timing) or reducing the air-fuel ratio (enriching). To execute such processing, it is necessary to determine or detects the occurrence of abnormal combustion accurately.

A known method of detecting abnormal combustion is to obtain the highest intensity (peak value) of vibration or the vibration intensity waveform appearing in a determination period (e.g. from the late stage of the compression stroke to the early stage of the expansion stroke) set for each cylinder 2 and to compare the peak value with a determination threshold or compare the vibration intensity waveform with a reference waveform, thereby determining whether abnormal combustion is occurring or not.

Figure 2:
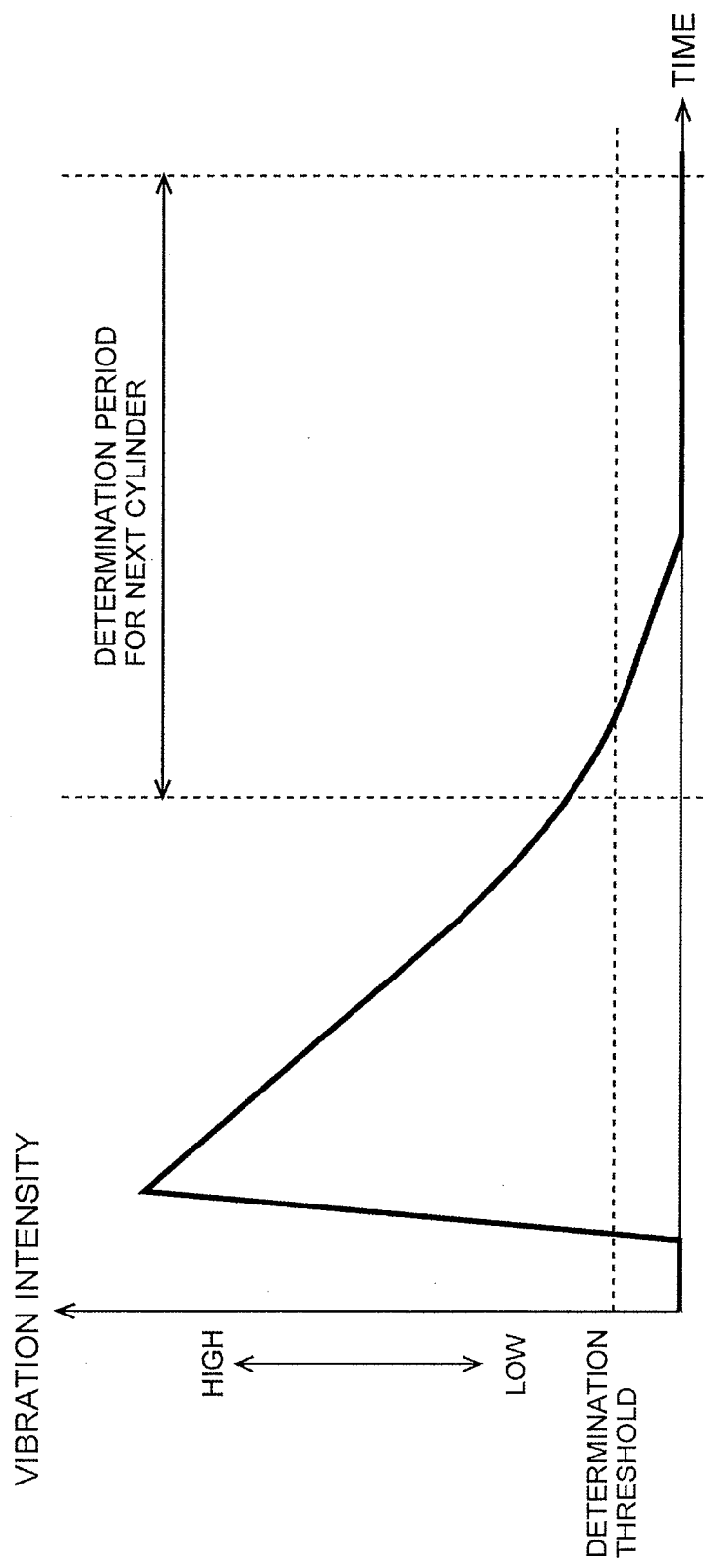
FIG. 2 is a graph showing the change with time in the vibration intensity and its relation to a determination period for a next cylinder in a case where abnormal combustion occurs.

In the case where abnormal combustion causing strong vibration such as knock or pre-ignition with high vibration intensity occurs, there is a possibility that the vibration caused by such abnormal combustion may linger in the determination period for the next cylinder. In particular, when the engine speed is high, there is a possibility that relatively strong vibration may linger because the interval between the determination periods is short. For example, if abnormal combustion with a vibration intensity much higher than the determination threshold occurs in one cylinder 2 of the internal combustion engine 1, the vibration lingers in the determination period for the next cylinder as shown in FIG. 2. Then, the intensity of the lingering vibration may exceed the determination threshold. In this case, there is a possibility that it may be determined mistakenly that abnormal combustion is occurring in the next cylinder, though it is not occurring.

In the abnormal combustion detection processing in this embodiment, when it is determined that abnormal combustion occurs in one cylinder 2, the ECU 9 computes the intensity of vibration that will linger in the determination period for the next cylinder and corrects the determination threshold to be referred to in the determination processing for the next cylinder.

The intensity of vibration lingering in the determination period for the next cylinder can be computed using as parameters the peak value of the vibration intensity at the time of the occurrence of abnormal combustion, the damping rate of the vibration intensity, and the length of time from the time at which the vibration intensity reaches the peak value to the time of beginning of the determination period for the next cylinder (which will be hereinafter referred to as the "allowance time").

The peak value of the vibration intensity can be determined based on the vibration intensity waveform. The damping rate of the vibration intensity depends on the damping capability (vibration damping rate) of the cylinder block, and it can be determined in advance based on the vibration damping rate of the cylinder block. The allowance time can be calculated from the position of the crankshaft (crank angle) at the time when the vibration intensity reaches the peak value, the crank angle at the time of beginning of the determination period of the next cylinder, and the engine speed as parameters.

The ECU 9 computes the magnitude of the intensity of the vibration lingering at the time of beginning of the determination period for the next cylinder (which will be hereinafter referred to as the "lingering vibration intensity") using as parameters the peak value of the vibration intensity, the damping rate of the vibration intensity, and the allowance time. In connection with this, the relationship of the lingering vibration intensity with the peak value of the vibration intensity, the damping rate of the vibration intensity, and the allowance time may be prepared as a map or function expression stored in the ROM of the ECU 9. Since the damping rate of the vibration intensity and the crank angle at the time when the determination period for the next cylinder begins are constant, a map or function equation of which parameters are the peak value of the vibration intensity, the crank angle at the time when the vibration intensity reaches the peak value, and the engine speed may be used.

Figure 3:
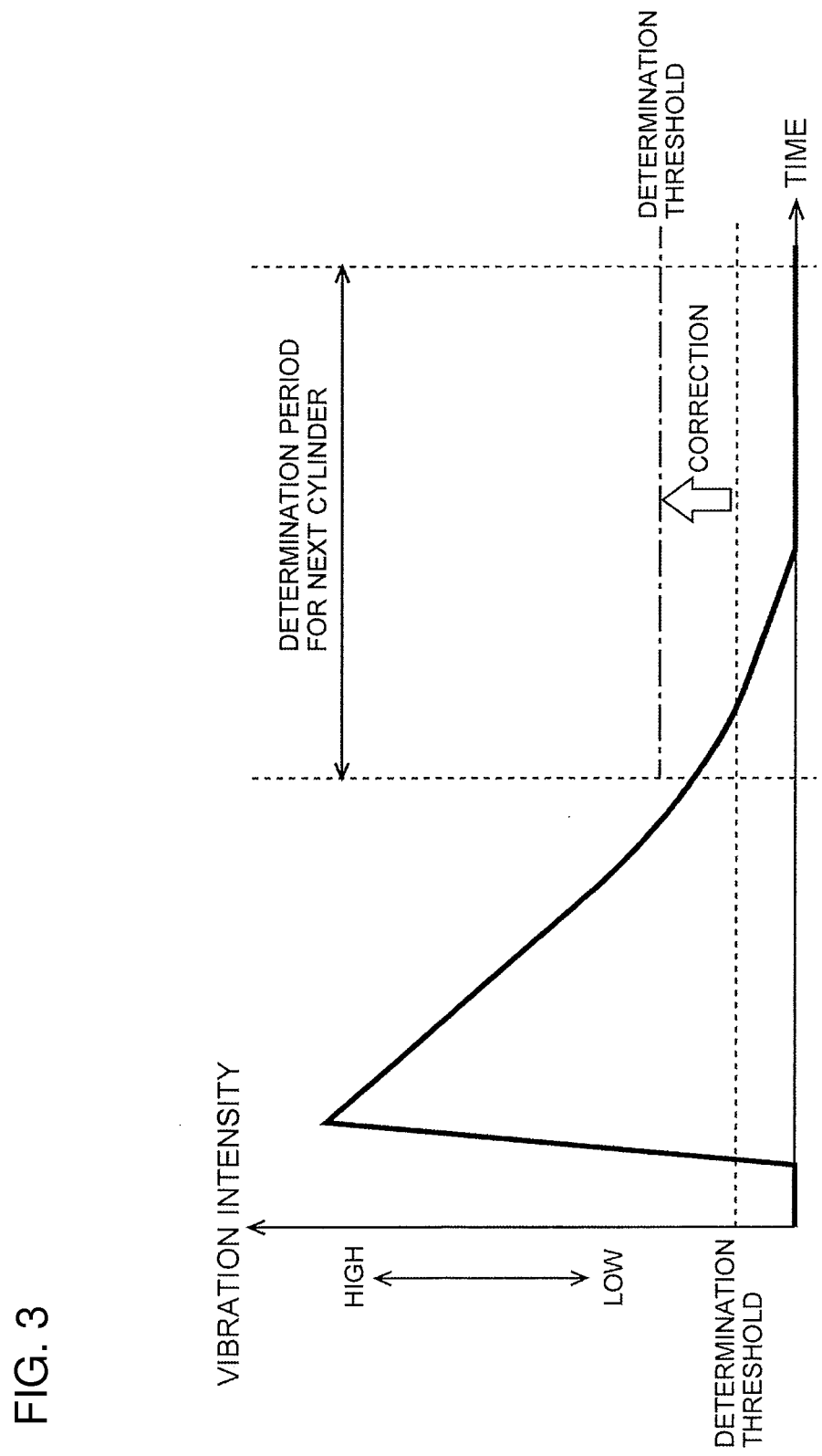
FIG. 3 is a graph showing a method of correcting a determination threshold to be used in determination processing for the next cylinder when abnormal combustion occurs.

Then, the ECU 9 corrects the determination threshold to be used in the determination processing for the next cylinder to change it to a value larger than the aforementioned lingering vibration intensity (as indicated by chain line in FIG. 3). For example, the ECU 9 may set the determination threshold for the next cylinder to a value equal to the sum of the determination threshold before correction and the lingering vibration intensity. While the determination threshold after correction is a constant value in the illustrative case shown in FIG. 3, the determination threshold may be varied with change in the vibration intensity over time. For example, the ECU 9 may decrease the determination threshold in accordance with the damping rate of the vibration intensity as shown in FIG. 4.

Figure 4:
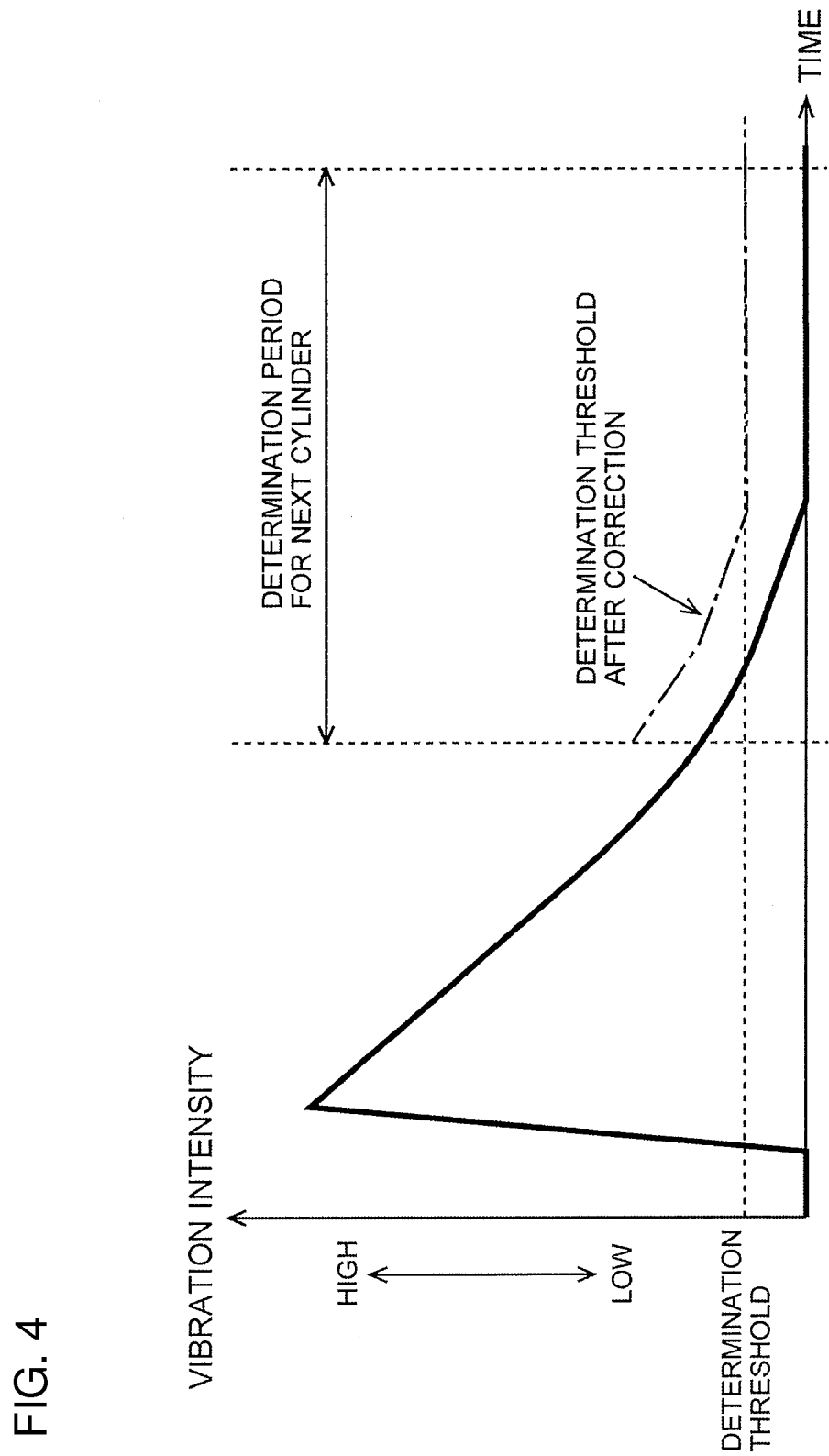
FIG. 4 is a graph showing another method of correcting a determination threshold to be used in determination processing for the next cylinder when abnormal combustion occurs.

If the determination threshold for the next cylinder is corrected in a fashion shown in FIG. 3 or 4, an incorrect determination that abnormal combustion is occurring in the next cylinder is unlikely to be made when abnormal combustion is not occurring in the next cylinder. Consequently, in the case where abnormal combustion causing strong vibration such as knock or pre-ignition with high vibration intensity occurs in one cylinder, the determination processing for the next cylinder can be performed with improved accuracy.

Figure 5:
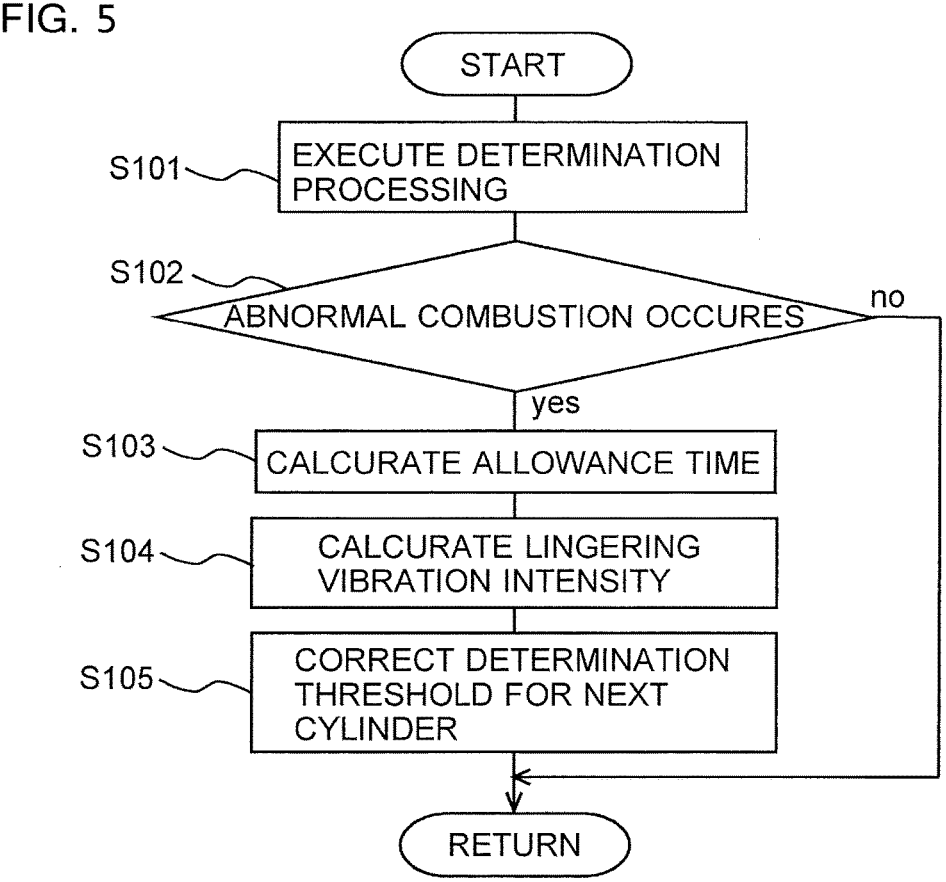
FIG. 5 is a flow chart of a processing routine executed by an ECU when abnormal detection processing is performed in a first embodiment.

In the following, the procedure of performing abnormality detection processing in this embodiment will be described with reference to FIG. 5. FIG. 5 is a flow chart of a processing routine executed by the ECU 9 when the abnormality detection processing is performed. This routine is stored in the ROM or the like of the ECU 9 in advance and executed by the ECU 9 (CPU) periodically.

In the processing routine shown in FIG. 5, firstly in the processing of step S101, the ECU 9 executes the determination processing for a cylinder 2 of which the crank angle is in a range corresponding to the determination period. For example, the ECU 9 extracts vibration components in a specific frequency band from values measured by the knock sensor 12 during the determination period. In this process, the ECU 9 may use a band pass filter that passes only vibration components in the specific frequency band. The "specific frequency band" mentioned above is a band which includes frequencies of vibrations caused by abnormal combustion. The measurement means according to the present invention is embodied by the extraction of the vibration intensity from measurement signals of the knock sensor 12 by the ECU 9. Then, the ECU 9 divides the aforementioned determination period into equal calculation periods (e.g. periods corresponding to every five-degree crank rotation) and integrates the vibration intensity in each calculation period. The ECU 9 computes a vibration intensity waveform in which the crank angles and the integrated values in the respective calculation periods are interrelated with each other. The ECU 9 determines the peak value from the vibration intensity waveform. Then, the ECU 9 determines whether or not the aforementioned peak value is larger than a determination threshold.

In the processing of step S102, the ECU 9 determines whether or not abnormal combustion is occurring. Specifically, if it is determined in the processing of step S101 that the aforementioned peak value is larger than the determination threshold, the ECU 9 determines that abnormal combustion is occurring. On the other hand, if it is determined in the processing of step S101 that the aforementioned peak value is not larger than the threshold, the ECU 9 determines that abnormal combustion is not occurring. The determination means according to the present invention is embodied by the execution of the processing of step S102 by the ECU 9.

If it is determined in the processing of the above step S102 that abnormal combustion is occurring, the ECU 9 proceeds to the processing of step S103, in which the ECU 9 computes the allowance time using as parameters the crank angle at the time when the integrated value of the vibration intensity has the aforementioned peak value, the crank angle at the time when the determination period for the next cylinder begins, and the engine speed.

In the processing of step S104, the ECU 9 computes the lingering vibration intensity using as parameters the aforementioned peak value, the damping rate of the vibration intensity (i.e. the vibration damping rate of the cylinder block), and the allowance time.

In the processing of step S105, the ECU 9 corrects the determination threshold to be used in the determination processing for the next cylinder on the basis of the lingering vibration intensity calculated in the processing of the above step S104. The ways of correction described above with reference to FIGS. 3 and 4 may be employed in this processing. Even in cases where vibration caused by abnormal combustion occurring in one cylinder 2 lingers in the determination period for the next cylinder, correcting the determination threshold in this way enables the determination processing for the next cylinder to be performed with improved accuracy. Consequently, an incorrect determination that abnormal combustion is occurring in the next cylinder is unlikely to be made when abnormal combustion is not occurring in the next cylinder.

The correction means according to the present invention is embodied by the execution of the processing of steps S103 to S105 by the ECU 9.

When it is determined in the processing of step S102 that abnormal combustion is not occurring, the ECU 9 terminates the execution of this processing routine without correcting the determination threshold to be used in the determination processing for the next cylinder. In this case, the determination processing for the next cylinder is executed using a normal determination threshold.

According to the above-described embodiment, in cases where vibration caused by abnormal combustion occurring in one cylinder lingers in the determination period for the next cylinder in a spark-ignition internal combustion engine having a plurality of cylinders, the determination processing for the next cylinder can be performed with improved accuracy.

In this embodiment, there has been described an illustrative case where when vibration caused by abnormal combustion occurring in one cylinder lingers in the determination period for the next cylinder, the determination threshold to be used in the determination processing for the next cylinder is corrected. Alternatively, the vibration intensity determined in the determination period for the next cylinder may be corrected instead of correcting the determination threshold.

Figure 6:
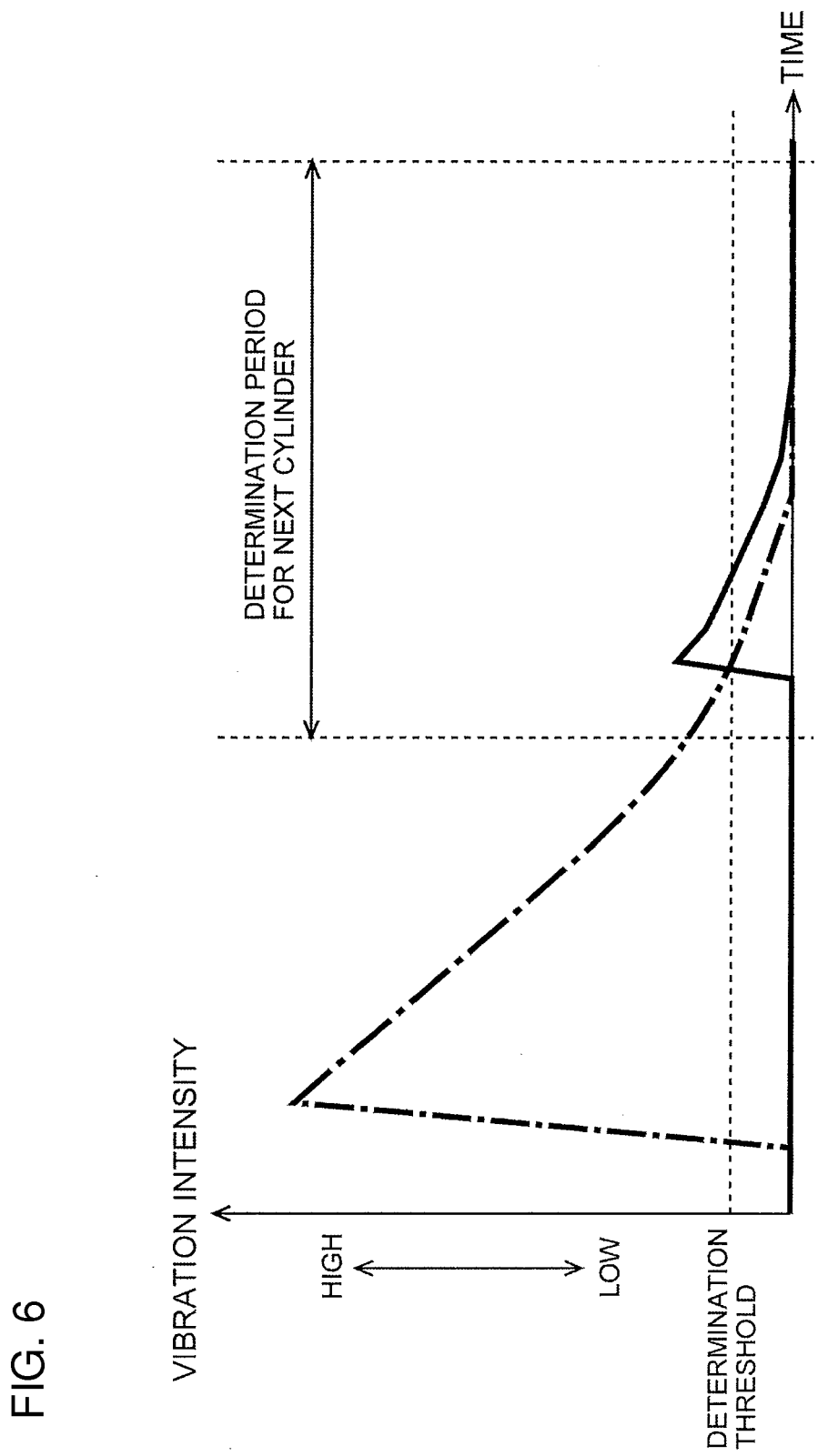
FIG. 6 is a graph illustrating a case where the vibration intensity measured in the determination period for the next cylinder is corrected when abnormal combustion occurs.

For example, as shown in FIG. 6, the vibration intensity waveform of the former cylinder (represented by the chain line in FIG. 6) may be subtracted from the vibration intensity waveform of the next cylinder (represented by the solid line in FIG. 6), and the vibration intensity waveform resulting from the subtraction may be compared with a determination threshold. This method can also provide advantageous effects the same as the above-described embodiment.

When abnormal combustion causing strong vibration such as knock or pre-ignition with high vibration intensity occurs, there is a possibility that the vibration intensity may exceed the upper bound of the detection range. One countermeasure to this is to extend the detection range. However, this can lead to a deterioration in the detection accuracy for knocks with low vibration intensities.

In view of the above-described circumstance, as shown in FIG. 7, in the case where abnormal combustion with a vibration intensity (represented by the chain line in FIG. 7) exceeding the upper bound value of the detection range occurs, the ECU 9 may calculate the lingering vibration intensity using the duration of the period during which the vibration intensity waveform (represented by the solid line in FIG. 7) has the upper bound value (overflow period) instead of the peak value of the vibration intensity. Specifically, the ECU 9 may compute the lingering vibration intensity and correct the determination threshold to be used in the determination processing for the next cylinder, using as parameters the duration of the overflow period, the crank angle at the time when the overflow period begins, and the engine speed. This method can reduce the occurrence of incorrect determination while reducing the deterioration in the accuracy of knock detection.

<Embodiment 2>

Next, a second embodiment of the present invention will be described with reference to FIGS. 8 to 10. In the following, features different from those in the above-described first embodiment will be described, and like features will not be described.

This embodiment differs from the above-described first embodiment in that discrimination between abnormal combustion and white noise is made. The measurement signal of the knock sensor 12 may contain various noises. In particular, when it contains white noise, which has uniform intensity throughout the entire frequency range, there is a possibility that an incorrect determination that abnormal combustion is occurring may be made, though abnormal combustion is not occurring. If such an incorrect determination is made and the determination threshold to be used in the determination processing for the next cylinder is corrected, there is a possibility that an incorrect determination may be made also in the determination processing for the next cylinder.

Figure 8A:
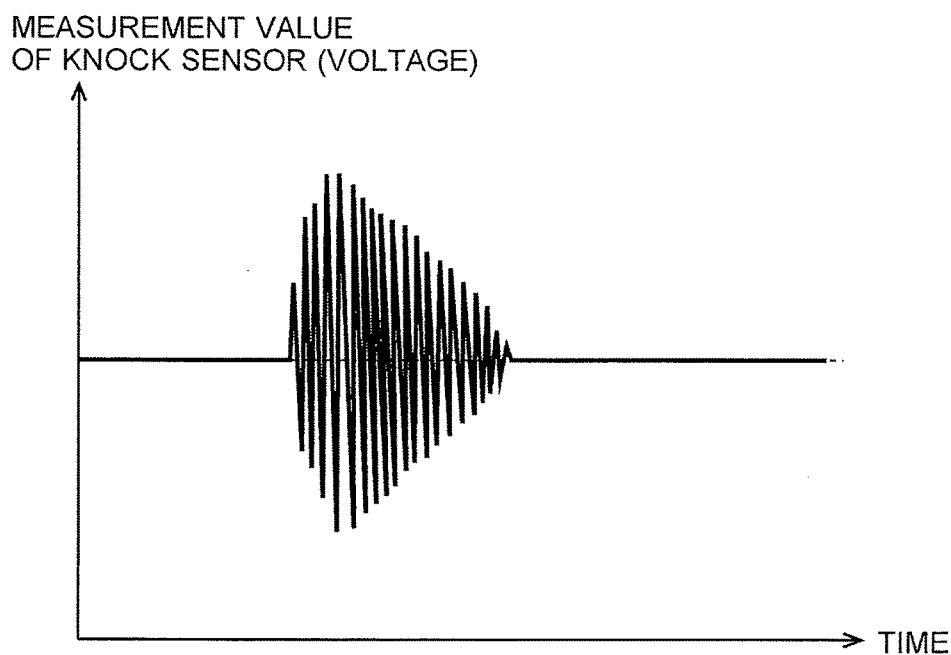
FIG. 8(a) is a graph showing the measurement signal of a knock sensor in the case where abnormal combustion occurs.
Figure 8B:
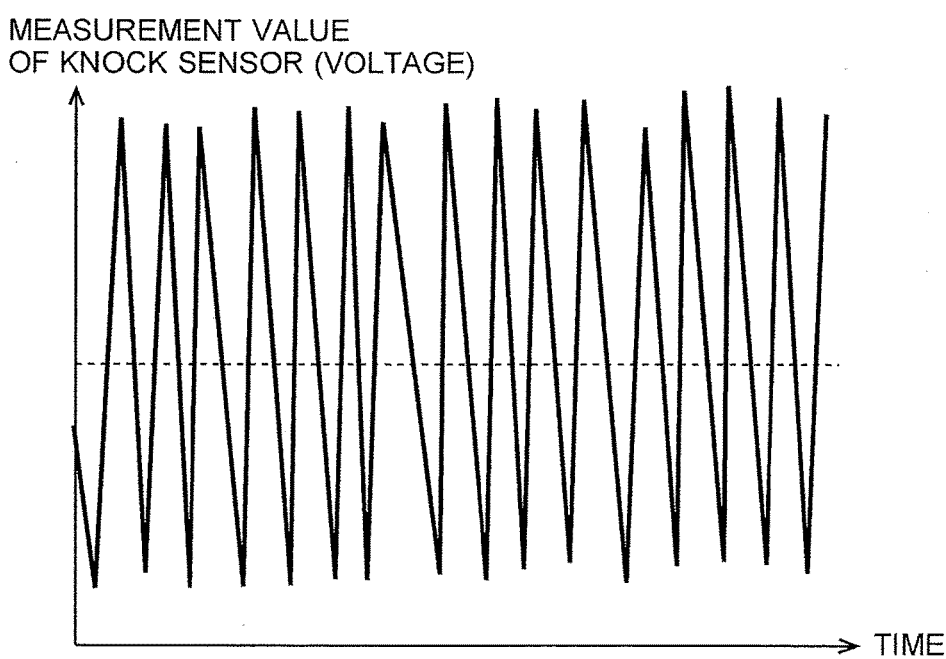
FIG. 8(b) is a graph showing the measurement signal of the knock sensor in a case where there is white noise.

FIG. 8 shows the change with time of the measurement signal of the knock sensor 12. Graph (a) in FIG. 8 shows the change with time of the measurement signal of the knock sensor 12 in a case where abnormal combustion occurs. Graph (b) in FIG. 8 shows the change with time of the measurement signal of the knock sensor 12 in a case where there is white noise. In the case where abnormal combustion occurs, the amplitude of the measurement signal increases abruptly and thereafter diminishes gradually, as shown in graph (a) in FIG. 8. On the other hand, in the case where there is white noise, the measurement signal continuously has a large amplitude, as shown in graph (b) in FIG. 8.

Figure 9A:
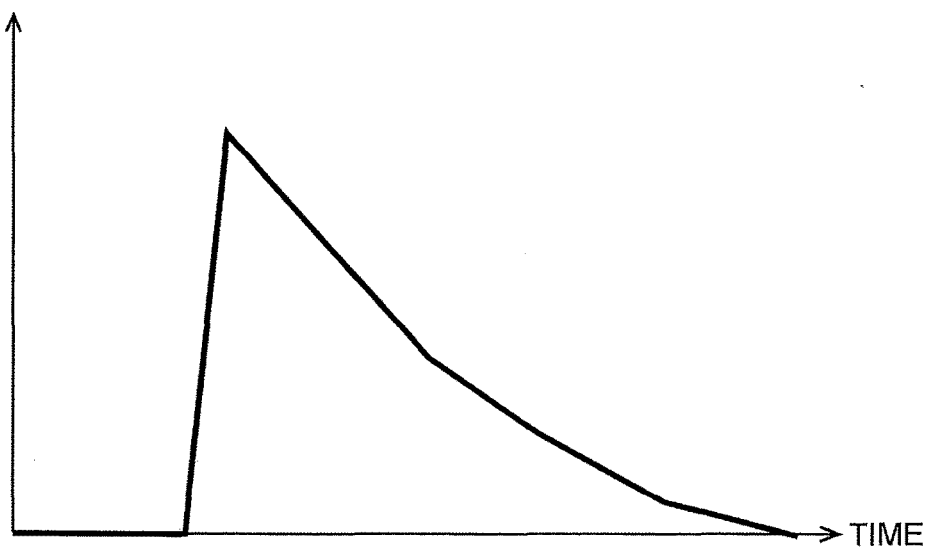
FIG. 9(a) is a graph showing a vibration intensity waveform in a case where abnormal combustion occurs.
Figure 9B:
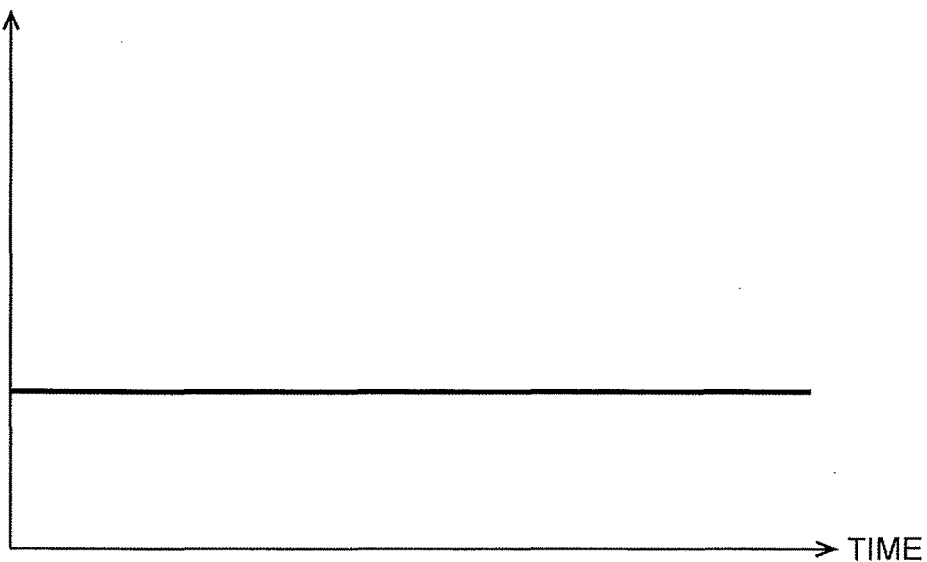
FIG. 9(b) is a graph showing a vibration intensity waveform in a case where there is white noise.

Therefore, in the case where abnormal combustion occurs, the vibration intensity waveform computed from measurement signals of the knock sensor 12 once reaches a peak value and thereafter decreases gradually, as shown in graph (a) in FIG. 9. On the other hand, in the case where there is white noise, the vibration intensity waveform computed from measurement signals of the knock sensor 12 continuously has values larger than a certain value.

Therefore, in the abnormality detection processing of this embodiment, when the state in which the vibration intensity waveform has values larger than a certain value continues for a certain length of time or more, the ECU 9 determines that abnormal combustion is not occurring but there is white noise. In other words, when the number of the calculation periods in which the integrated value of the vibration intensity is equal to or larger than a certain value is equal to or larger than a predetermined number, the ECU 9 determines that abnormal combustion is not occurring but there is white noise.

In the following, the procedure of performing abnormality detection processing in this embodiment will be described with reference to FIG. 10. FIG. 10 is a flow chart of a processing routine executed by the ECU 9 when the abnormality detection processing is performed. In FIG. 10, the processing steps the same as those in the processing routine (FIG. 5) in the above-described first embodiment are denoted by the same reference numerals.

Figure 10:
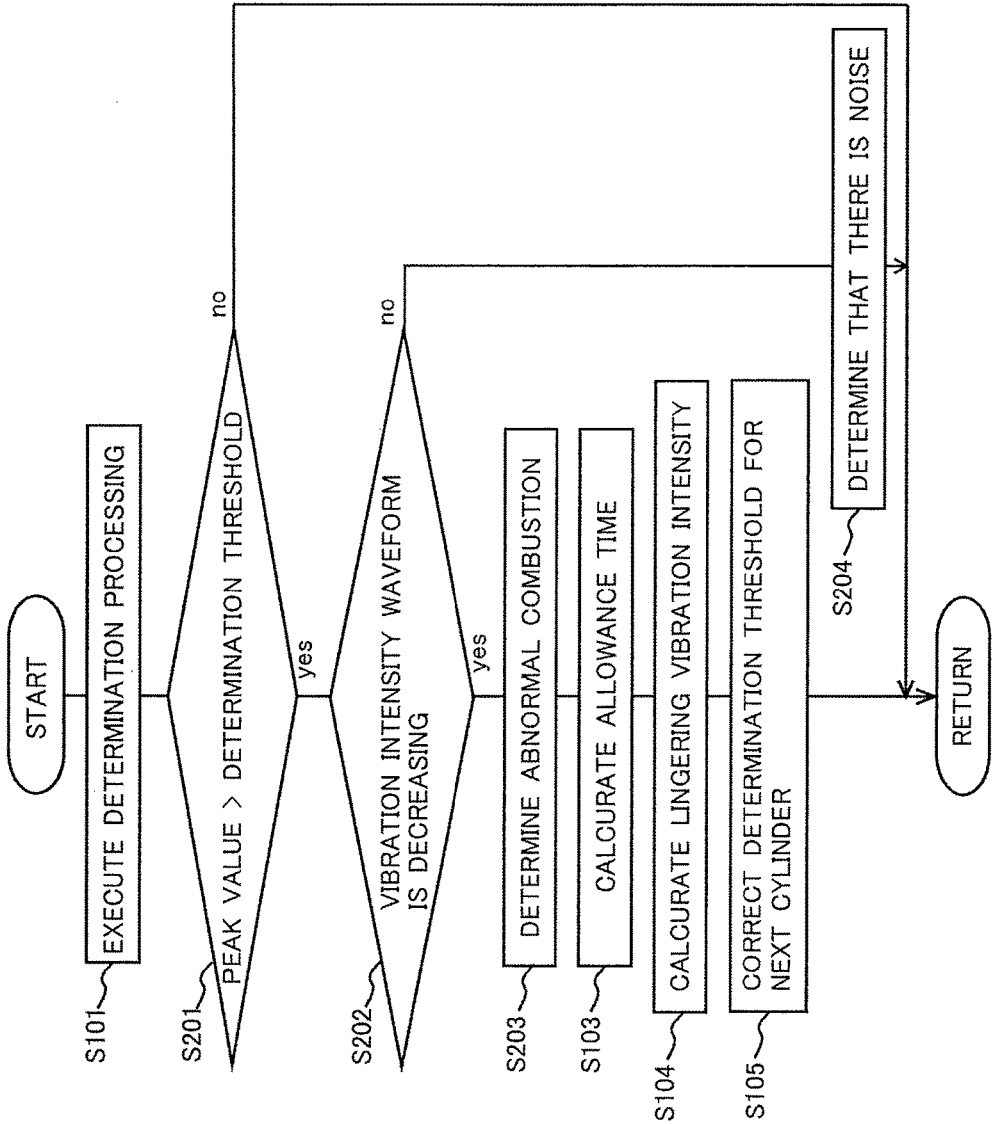
FIG. 10 is a flow chart of a processing routine executed by the ECU when abnormal detection processing is performed in a second embodiment.

In the processing routine shown in FIG. 10, after executing the processing of step S101, the ECU 9 executes the processing of step S201. In the processing of step S201, the ECU 9 determines whether or not the peak value of the vibration waveform determined in the processing of step S101 is larger than a determination threshold. If the determination made in step S201 is negative, the ECU 9 once terminates the execution of this processing routine. On the other hand, if the determination made in step S201 is affirmative, the ECU 9 proceeds to the processing of step S202.

In the processing of step S202, the ECU 9 determines whether or not the vibration intensity waveform obtained in the processing of step S101 is decreasing. In this processing, if the number of the calculation periods in which the integrated value of the vibration intensity is equal to or larger than a certain value is smaller than a predetermined number (namely, if the state in which the integrated values of the vibration intensity are equal to or higher than the certain value does not continue for a predetermined length of time or more), the ECU 9 determines that the vibration intensity waveform is decreasing. On the other hand, if the number of the calculation periods in which the integrated value of the vibration intensity is equal to or larger than the certain value is equal to or larger than the predetermined number (namely, if the state in which the integrated values of the vibration intensity are equal to or higher than the certain value continues for a predetermined length of time or more), the ECU 9 determines that the vibration intensity waveform is not decreasing.

If the determination made in the processing of the above step S202 is affirmative, the ECU 9 determines that abnormal combustion occurs, in the processing of step S203, and then executes the processing of steps S103 to S105. On the other hand, if the determination made in the processing of step S202 is negative, the ECU 9 proceeds to step S204, where it determines that there is noise (white noise).

According to the above-described embodiment, in the case where there is white noise, an incorrect determination that abnormal combustion is occurring is unlikely to be made when abnormal combustion is not occurring. Consequently, the accuracy of detection in the abnormal combustion detection processing can be further enhanced.

In the case where the level of white noise is relatively high, there is a possibility that the vibration intensity waveform obtained from measurement signals of the knock sensor 12 may overflow beyond the detection range. The overflow period in the case where there is white noise is longer than the overflow period in the case where abnormal combustion occurs. Therefore, it may de determined that there is white noise on condition that the duration of the overflow period is equal to or longer than a predetermined period.

DESCRIPTION OF THE REFERENCE SIGNS

1: internal combustion engine
2: cylinder
3: ignition plug
4: intake port
5: exhaust port
6: intake valve
7: exhaust valve
8: fuel injection valve
9: ECU
10: crank position sensor
11: accelerator position sensor
12: knock sensor
40: intake pipe
41: throttle valve
42: air flow meter
50: exhaust pipe

The invention claimed is:

1. An abnormal combustion detection apparatus for a spark-ignition internal combustion engine having a plurality of cylinders, comprising:
an electronic control unit (ECU) including a CPU, memory, a measurement unit, a determination unit, and a correction unit, and
a plurality of sensors located on the internal combustion engine that are connected to the ECU,
the ECU configured to:
measure a vibration intensity of the internal combustion engine with the measurement unit;
perform determination processing, which determines that abnormal combustion occurs, if the vibration intensity measured by said measurement unit in a determination period set for each cylinder is higher than a determination threshold, with the determination unit; and
correct a determination threshold to be used in determination processing for a next cylinder on the basis of a peak value of the vibration intensity measured by said measurement unit at the time when the abnormal combustion occurs and an engine speed, when it is determined by said determination unit that the abnormal combustion occurs, with the correction unit.

2. An abnormal combustion detection apparatus according to claim 1, wherein, said correction unit calculates the intensity of vibration lingering in the determination period for the next cylinder using as parameters said peak value and said engine speed of the internal combustion and corrects the determination threshold by adding a result of the calculation to the determination threshold.

3. An abnormal combustion detection apparatus according to claim 1, wherein, said correction unit uses, as a value correlating with said peak value, a duration of a period during which the vibration intensity measured by said measurement unit is equal to or higher than an upper limit value of a measurement range of said measurement unit.

4. An abnormal combustion detection apparatus according to claim 1, wherein if a duration of a period during which the vibration intensity measured by said measurement unit is equal to or higher than an upper limit value of a measurement range of said measurement unit is equal to or longer than a predetermined length of time, said determination unit determines that there is noise.

5. An abnormal combustion detection apparatus according claim 1, wherein said determination unit integrates the vibration intensity in every equal specific period shorter than said determination period and determines that there is noise if a number of the periods in which the integrated value exceeds a specific value is equal to or larger than a predetermined number.

6. An abnormal combustion detection apparatus according to claim 2, wherein said correction unit uses, as a value correlating with said peak value, a duration of a period during which the vibration intensity measured by said measurement unit is equal to or higher than an upper limit value of a measurement range of said measurement unit.

7. An abnormal combustion detection apparatus according to claim 2, wherein if a duration of a period during which the vibration intensity measured by said measurement unit is equal to or higher than an upper limit value of the measurement range of said measurement unit is equal to or longer than a predetermined length of time, said determination unit determines that there is noise.

8. An abnormal combustion detection apparatus according to claim 3, wherein if a duration of a period during which the vibration intensity measured by said measurement unit is equal to or higher than an upper limit value of a measurement range of said measurement unit is equal to or longer than a predetermined length of time, said determination unit determines that there is noise.

9. An abnormal combustion detection apparatus according to claim 6, wherein if a duration of a period during which the vibration intensity measured by said measurement unit is equal to or higher than an upper limit value of a measurement range of said measurement unit is equal to or longer than a predetermined length of time, said determination unit determines that there is noise.

10. An abnormal combustion detection apparatus according to claim 2, wherein said determination unit integrates the vibration intensity in every equal specific period shorter than said determination period and determines that there is noise if a number of the periods in which the integrated value exceeds a specific value is equal to or larger than a predetermined number.

11. An abnormal combustion detection apparatus according to claim 3, wherein said determination unit integrates the vibration intensity in every equal specific period shorter than said determination period and determines that there is noise if a number of the periods in which the integrated value exceeds a specific value is equal to or larger than a predetermined number.

12. An abnormal combustion detection apparatus according to claim 4, wherein said determination unit integrates the vibration intensity in every equal specific period shorter than said determination period and determines that there is noise if a number of the periods in which the integrated value exceeds a specific value is equal to or larger than a predetermined number.

13. An abnormal combustion detection apparatus according to claim 6, wherein said determination unit integrates the vibration intensity in every equal specific period shorter than said determination period and determines that there is noise if a number of the periods in which the integrated value exceeds a specific value is equal to or larger than a predetermined number.

14. An abnormal combustion detection apparatus according to claim 7, wherein said determination unit integrates the vibration intensity in every equal specific period shorter than said determination period and determines that there is noise if a number of the periods in which the integrated value exceeds a specific value is equal to or larger than a predetermined number.

15. An abnormal combustion detection apparatus according to claim 8, wherein said determination unit integrates the vibration intensity in every equal specific period shorter than said determination period and determines that there is noise if a number of the periods in which the integrated value exceeds a specific value is equal to or larger than a predetermined number.

16. An abnormal combustion detection apparatus according to claim 9, wherein said determination unit integrates the vibration intensity in every equal specific period shorter than said determination period and determines that there is noise if a number of the periods in which the integrated value exceeds a specific value is equal to or larger than a predetermined number.

\* \* \* \* \*